United States Patent
Abraham et al.

(10) Patent No.: US 9,686,791 B2
(45) Date of Patent: Jun. 20, 2017

(54) PROTOCOLS FOR ENABLING MODE 1 AND MODE 2 DEVICES IN TV WHITE SPACE NETWORKS

(71) Applicant: QUALCOMM Incorporated, San Diego, CA (US)

(72) Inventors: Santosh Paul Abraham, San Diego, CA (US); Avinash Jain, San Diego, CA (US); Stephen Shellhammer, Ramona, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 14/469,356

(22) Filed: Aug. 26, 2014

(65) Prior Publication Data
US 2014/0362819 A1 Dec. 11, 2014

Related U.S. Application Data

(62) Division of application No. 13/286,515, filed on Nov. 1, 2011, now Pat. No. 9,173,218.
(Continued)

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0096* (2013.01); *H04W 16/14* (2013.01); *H04W 88/06* (2013.01)

(58) Field of Classification Search
CPC . H04W 72/0453; H04W 88/06; H04W 16/14; H04L 5/0096
See application file for complete search history.

(56) References Cited

U.S. PATENT DOCUMENTS 8,472,461 B2 6/2013 Keon
8,514,799 B2 8/2013 Kim et al.
(Continued)

FOREIGN PATENT DOCUMENTS

CN 101860914 A 10/2010
JP 2006201896 A 8/2006
(Continued)

OTHER PUBLICATIONS

Kafle P., et al., "TVWS WLAN Enablement—Discussions and Open Issues", IEEE, 802.11-10/1056r0, IEEE, Sep. 10, 2010, pp. 1-30.
(Continued)

*Primary Examiner* — Thai Nguyen
(74) *Attorney, Agent, or Firm* — Kevin M. Donnelly

(57) ABSTRACT

Certain aspects of the present disclosure provide techniques and apparatus for operating in a television white space (TVWS) network. One example method generally includes receiving, at an apparatus, a message with a field indicating a current version of an unused frequency spectrum map (e.g., a white space map (WSM)), the unused frequency spectrum map indicating channels usable for wireless communications; determining whether the current version of the unused frequency spectrum map is different than a previous version of the unused frequency spectrum map; and using a channel for wireless communications based on the determination. Another example method generally includes accessing a database of available channels for a current location of an apparatus via a neighboring portable or fixed enabling apparatus and enabling one or more portable dependent apparatuses for the wireless communications via one or more of the available channels.

23 Claims, 17 Drawing Sheets

Related U.S. Application Data

(60) Provisional application No. 61/409,215, filed on Nov. 2, 1010, provisional application No. 61/410,631, filed on Nov. 5, 2010.

(51) Int. Cl.
*H04W 16/14* (2009.01)
*H04W 88/06* (2009.01)

(56) References Cited

U.S. PATENT DOCUMENTS

| | | |
|---|---|---|
| 8,583,129 B2 | 11/2013 | Kim et al. |
| 8,588,158 B2 | 11/2013 | Kim et al. |
| 8,692,891 B2 | 4/2014 | Li et al. |
| 2005/0198536 A1* | 9/2005 | Brickell .................. G06Q 10/10 726/5 |
| 2006/0105778 A1 | 5/2006 | Wiederspahn |
| 2007/0064655 A1 | 3/2007 | Ruuska |
| 2009/0150933 A1 | 6/2009 | Lee et al. |
| 2009/0247201 A1 | 10/2009 | Ye et al. |
| 2010/0195590 A1 | 8/2010 | Park |
| 2010/0220687 A1 | 9/2010 | Reznik et al. |
| 2010/0246506 A1 | 9/2010 | Krishnaswamy |
| 2010/0309806 A1 | 12/2010 | Wu et al. |
| 2011/0090887 A1 | 4/2011 | Kim et al. |
| 2011/0222488 A1 | 9/2011 | Kim et al. |
| 2011/0268095 A1* | 11/2011 | Kim ..................... H04W 16/14 370/338 |
| 2011/0286405 A1 | 11/2011 | Kim et al. |
| 2011/0299481 A1 | 12/2011 | Kim et al. |
| 2011/0310816 A1 | 12/2011 | Kim et al. |
| 2012/0071189 A1 | 3/2012 | Mody |
| 2012/0076118 A1 | 3/2012 | Montemurro et al. |
| 2012/0093092 A1* | 4/2012 | Kasslin ............... H04W 72/082 370/329 |
| 2012/0282959 A1 | 11/2012 | Abraham et al. |
| 2013/0156007 A1 | 6/2013 | Kim et al. |
| 2013/0163574 A1 | 6/2013 | Seok et al. |
| 2013/0231108 A1 | 9/2013 | Kim et al. |
| 2013/0267237 A1 | 10/2013 | Kim et al. |
| 2014/0105133 A1 | 4/2014 | Kim et al. |
| 2014/0362817 A1 | 12/2014 | Abraham et al. |

FOREIGN PATENT DOCUMENTS

| | | |
|---|---|---|
| JP | 2012060453 A | 3/2012 |
| JP | 2012521729 | 9/2012 |
| JP | 2013529448 A | 7/2013 |
| WO | 2010111150 A2 | 9/2010 |

OTHER PUBLICATIONS

Lan et al., "Normative Text for Deployment Scenarios and Signalling Method for Enablement", IEEE P802.11 Wireless LANs Sep. 6, 2010, pp. 1-3, XP002673438, Retrieved from the Internet: URL:https://mentor.ieee.org/802.II/dcn/II-10-1037-00-00af-normative-text-for-depl oyment-scenarios-and-signalling-methods-for-enablement.doc [retrieved on Apr. 4, 2012].

Akyildiz, et al., Flexible and Spectrum-Aware Radio Access through Measurements and Modelling in Cognitive Radio Systems, FARAMIR (ICT-248351), Document: D2.1, Date: Apr. 30, 2010, WP2, PU, R, Version: 1.0, 160 pages.

European Search Report—EP13020101—Search Authority—Munich—Aug. 4, 2014.

International Preliminary Report on Patentability—PCT/US2011/058966—The International Bureau of WIPO—Geneva, Switzerland, Mar. 11, 2013.

International Search Report and Written Opinion—PCT/US2011/058966—ISA/EPO—May 16, 2012.

Lan Z., et al., "Normative Text for Deployment Scenarios and Signalling Method for Enablement", IEEE P802.11 Wireless LANs Sep. 6, 2010, pp. 1-3, XP002673438, Retrieved from the Internet: URL: https://mentor.ieee.org/802.11/dcn/10/11-10-1037-00-00af-normative-text-for-deployment-scenarios-and-signalling-methods-for-enablement.doc [retrieved on Apr. 4, 2012].

\* cited by examiner

FCC Device Modes for TVWS

| Type | Subtype | Max EIRP | No. of Chan | DB Access | Geo Loc | |
|---|---|---|---|---|---|---|
| Fixed | Fixed | 4W | 48 | Yes | Yes | Must check availability of the channel at least once a day. Must cease immediately if channel is not available. |
| Mobile/ Portable | Mode 1 | 100mW | 30 | No | No | Must obtain a list of available channels over the air from a fixed or Mode II device. Must verify availability of channel every 60s. Must stop using channel if the channel cannot be verified. |
| | Mode 2 | 100mW | 30 | Yes | Yes | -Needs to check the database at least once a day<br>-Combines own geo location information with database information to determine available channels.<br>--Access to database may be through any technology.<br>--Needs to check location every 60s<br>--If location has changed by more than 100m,<br>----availability of channel at new location must be checked. |

FIG. 4

RLQP Extension For OTA Database Access

| Info Name | Info ID | RLQP Info Element (clause) |
|---|---|---|
| Reserved | 0 | N/A |
| DSE Enablement | 1 | 7.3.5.1 |
| RLQP query list | <ANA> | |
| RLQP capability list | <ANA> | |
| Database Query/Response | <ANA> | N/A |
| Reserved | 7-220 | N/A |
| Vendor Specific | 221 | 7.3.2.26 |
| Reserved | 222-255 | N/A |

FIG. 17

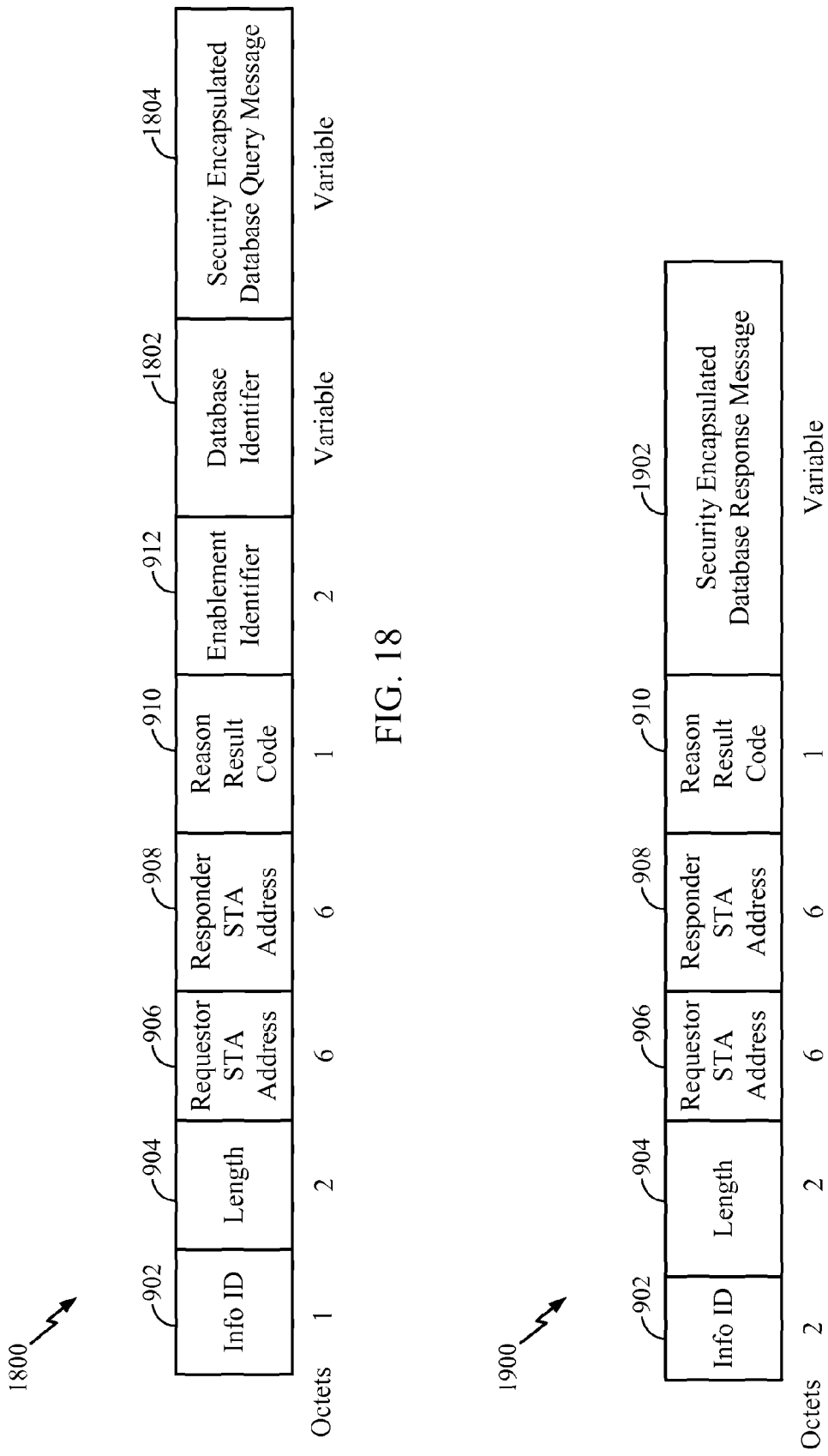

PROTOCOLS FOR ENABLING MODE 1 AND MODE 2 DEVICES IN TV WHITE SPACE NETWORKS

CROSS-REFERENCE TO RELATED APPLICATIONS

This application is a divisional of patent application Ser. No. 13/286,515 filed Nov. 1, 2011, pending, which claims priority to Provisional Patent Application No. 61/409,215, filed Nov. 2, 2010, and Provisional Patent Application No. 61/410,631, filed Nov. 5, 2010, both of which are herein incorporated by reference.

BACKGROUND

Field

Certain aspects of the present disclosure generally relate to wireless communications and, more particularly, to operating in a television white space (TVWS) network.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements demanded for wireless communications systems, different schemes are being developed. One scheme known as "white-fi" entails expanding Wi-Fi technology with the unused frequency spectrum in the television (TV) band (i.e., the TV white space). An Institute of Electrical and Electronics Engineers (IEEE) 802.11af task group has been created to define an amendment to the IEEE 802.11 standard for using the TV white space (TVWS). The IEEE 802.11 denotes a set of Wireless Local Area Network (WLAN) air interface standards developed by the IEEE 802.11 committee for short-range communications (e.g., tens of meters to a few hundred meters). However, by using the TVWS with frequencies below 1 GHz, IEEE 802.11af may offer greater propagation distances to be achieved, in addition to the increased bandwidth offered by the unused frequencies in the TV spectrum.

SUMMARY

Certain aspects of the present disclosure provide an apparatus for wireless communications. The apparatus generally includes a receiver and a processing system. The receiver is typically configured to receive a message with a field indicating a current version of an unused frequency spectrum map (e.g., a white space map), the unused frequency spectrum map indicating channels usable for the wireless communications. The processing system is generally configured to determine whether the current version of the unused frequency spectrum map is different than a previous version of the unused frequency spectrum map and to use a channel for the wireless communications based on the determination.

Certain aspects of the present disclosure provide a method for wireless communications. The method generally includes receiving, at an apparatus, a message with a field indicating a current version of an unused frequency spectrum map, the unused frequency spectrum map indicating channels usable for the wireless communications; determining whether the current version of the unused frequency spectrum map is different than a previous version of the unused frequency spectrum map; and using a channel for the wireless communications based on the determination.

Certain aspects of the present disclosure provide an apparatus for wireless communications. The apparatus generally includes means for receiving a message with a field indicating a current version of an unused frequency spectrum map, the unused frequency spectrum map indicating channels usable for the wireless communications, means for determining whether the current version of the unused frequency spectrum map is different than a previous version of the unused frequency spectrum map, and means for using a channel for the wireless communications based on the determination.

Certain aspects of the present disclosure provide a computer-program product for wireless communications. The computer-program product generally includes a computer-readable medium having instructions executable to receive, at an apparatus, a message with a field indicating a current version of an unused frequency spectrum map, the unused frequency spectrum map indicating channels usable for the wireless communications; to determine whether the current version of the unused frequency spectrum map is different than a previous version of the unused frequency spectrum map; and to use a channel for the wireless communications based on the determination.

Certain aspects of the present disclosure provide a wireless node. The wireless node generally includes at least one antenna; a receiver configured to receive, via the at least one antenna, a message with a field indicating a current version of an unused frequency spectrum map, the unused frequency spectrum map indicating channels usable for wireless communications; and a processing system configured to determine whether the current version of the unused frequency spectrum map is different than a previous version of the unused frequency spectrum map and to use a channel for the wireless communications based on the determination.

Certain aspects of the present disclosure provide a first apparatus for wireless communications. The first apparatus generally includes a processing system configured to determine a version of an unused frequency spectrum map, the unused frequency spectrum map indicating channels usable for the wireless communications, and a transmitter configured to transmit a message with a field indicating the version of the unused frequency spectrum map.

Certain aspects of the present disclosure provide a method for wireless communications. The method generally includes determining, at a first apparatus, a version of an unused frequency spectrum map, the unused frequency spectrum map indicating channels usable for the wireless communications, and transmitting a message with a field indicating the version of the unused frequency spectrum map.

Certain aspects of the present disclosure provide a first apparatus for wireless communications. The first apparatus generally includes means for determining a version of an unused frequency spectrum map, the unused frequency spectrum map indicating channels usable for the wireless communications, and means for transmitting a message with a field indicating the version of the unused frequency spectrum map.

Certain aspects of the present disclosure provide a computer-program product for wireless communications. The computer-program product generally includes a computer-readable medium having instructions executable to determine, at an apparatus, a version of an unused frequency spectrum map, the unused frequency spectrum map indicating channels usable for the wireless communications, and to transmit a message with a field indicating the version of the unused frequency spectrum map.

Certain aspects of the present disclosure provide an access point. The access point generally includes at least one antenna; a processing system configured to determine a version of an unused frequency spectrum map, the unused frequency spectrum map indicating channels usable for the wireless communications; and a transmitter configured to transmit, via the at least one antenna, a message with a field indicating the version of the unused frequency spectrum map.

Certain aspects of the present disclosure provide an apparatus for wireless communications. The apparatus generally includes a processing system configured to access a database of available channels for a current location of the apparatus via a neighboring enabling apparatus and to enable one or more other apparatuses for the wireless communications via one or more of the available channels.

Certain aspects of the present disclosure provide a method for wireless communications. The method generally includes accessing, at an apparatus, a database of available channels for a current location of the apparatus via a neighboring enabling apparatus and enabling one or more other apparatuses for the wireless communications via one or more of the available channels.

Certain aspects of the present disclosure provide an apparatus for wireless communications. The apparatus generally includes means for accessing a database of available channels for a current location of the apparatus via a neighboring enabling apparatus and means for enabling one or more other apparatuses for the wireless communications via one or more of the available channels.

Certain aspects of the present disclosure provide a computer-program product for wireless communications. The computer-program product generally includes a computer-readable medium having instructions executable to access, at an apparatus, a database of available channels for a current location of the apparatus via a neighboring enabling apparatus and to enable one or more other apparatuses for the wireless communications via one or more of the available channels.

Certain aspects of the present disclosure provide an access point. The access point generally includes at least one antenna and a processing system configured to access a database of available channels for a current location of the access point via a neighboring enabling apparatus and enable one or more apparatuses for the wireless communications via one or more of the available channels.

Certain aspects of the present disclosure provide an apparatus for wireless communications. The apparatus generally includes a processing system configured to enable a non-enabled neighboring enabling-capable apparatus as a dependent apparatus and to access a database of available channels for the enabled neighboring apparatus; and a transmitter configured to transmit an indication of the available channels to the neighboring apparatus.

Certain aspects of the present disclosure provide a method for wireless communications. The method generally includes enabling, at an apparatus, a non-enabled neighboring enabling-capable apparatus as a dependent apparatus, accessing a database of available channels for the enabled neighboring apparatus, and transmitting an indication of the available channels to the neighboring apparatus.

Certain aspects of the present disclosure provide an apparatus for wireless communications. The apparatus generally includes means for enabling a non-enabled neighboring enabling-capable apparatus as a dependent apparatus, means for accessing a database of available channels for the enabled neighboring apparatus, and means for transmitting an indication of the available channels to the neighboring apparatus.

Certain aspects of the present disclosure provide a computer-program product for wireless communications. The computer-program product generally includes a computer-readable medium having instructions executable to enable, at an apparatus, a non-enabled neighboring enabling-capable apparatus as a dependent apparatus, to access a database of available channels for the enabled neighboring apparatus, and to transmit an indication of the available channels to the neighboring apparatus.

Certain aspects of the present disclosure provide an access point. The access point generally includes at least one antenna; a processing system configured to enable a non-enabled neighboring enabling-capable apparatus as a dependent apparatus and to access a database of available channels for the enabled neighboring apparatus; and a transmitter configured to transmit, via the at least one antenna, an indication of the available channels to the neighboring apparatus.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates a table of device modes for television white space (TVWS) as defined by the Federal Communications Commission (FCC) in accordance with certain aspects of the present disclosure.

FIG. 17 illustrates an extension to RLQP information identifier (ID) definitions for OTA database access, in accordance with certain aspects of the present disclosure.

FIG. 18 illustrates an example RLQP database access query message format, in accordance with certain aspects of the present disclosure.

FIG. 19 illustrates an example RLQP database access response message format, in accordance with certain aspects of the present disclosure.

DETAILED DESCRIPTION

Figure 1:
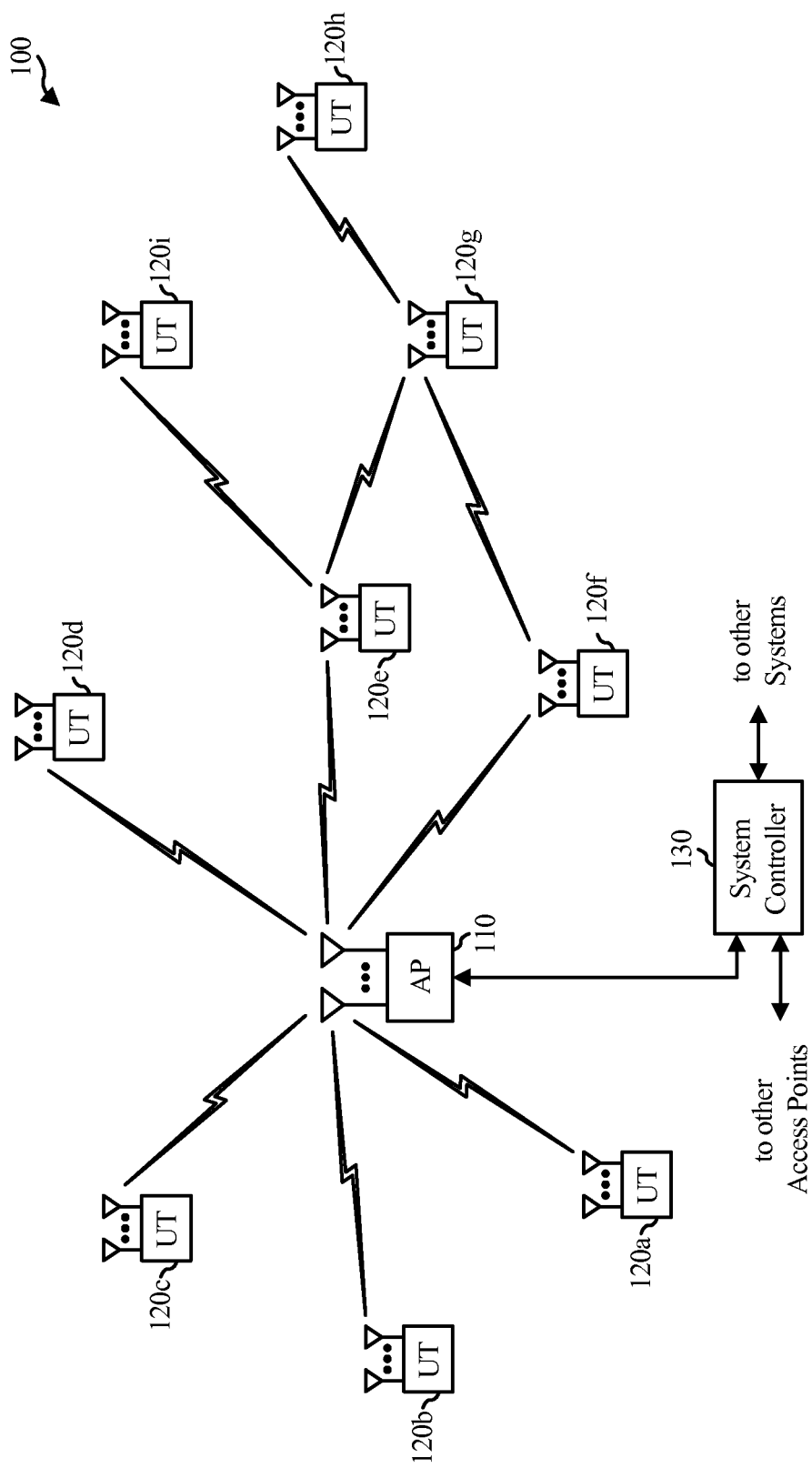
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station ("MS"), a remote station, a remote terminal, a user terminal ("UT"), a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant (PDA)), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
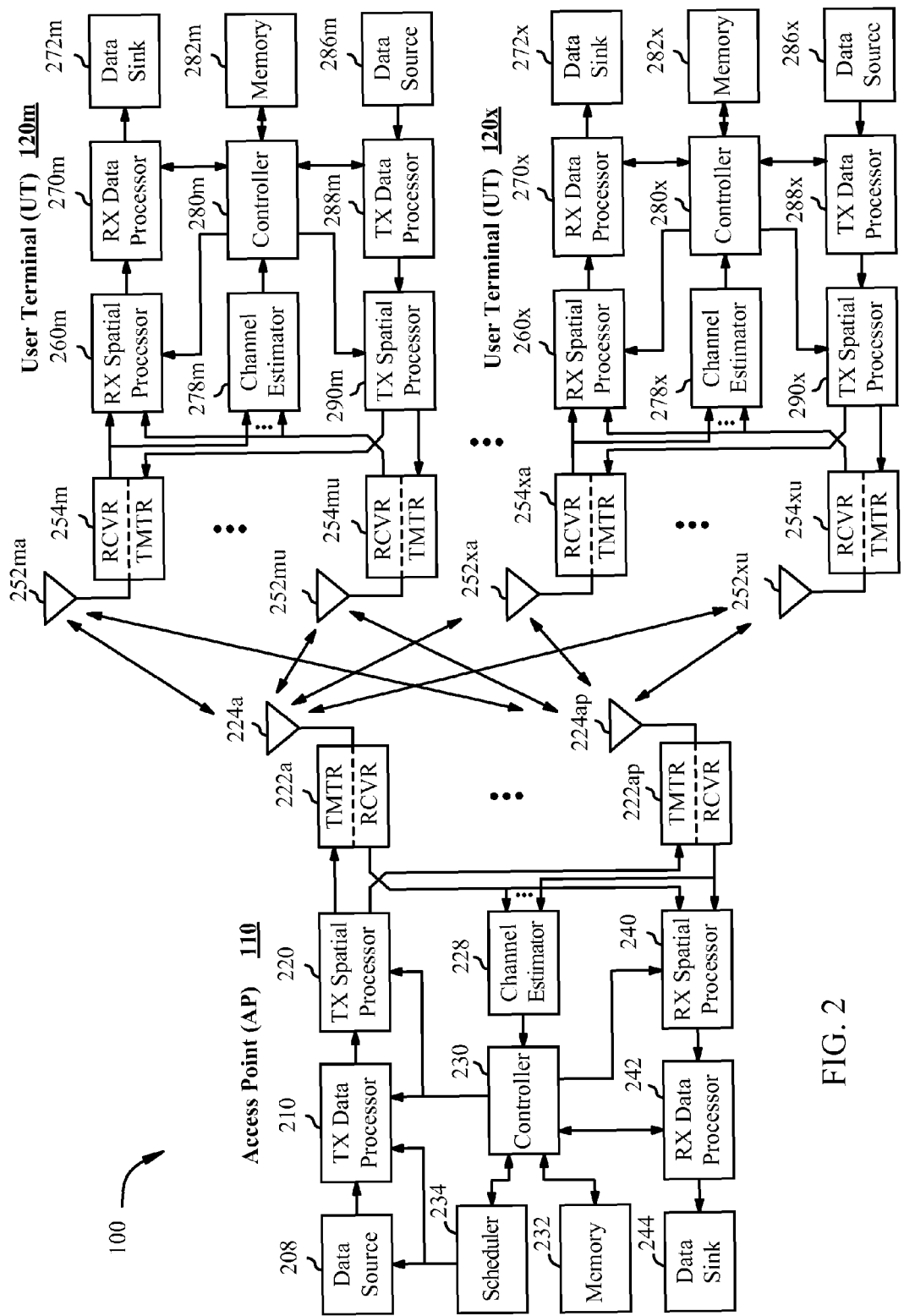
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$, may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
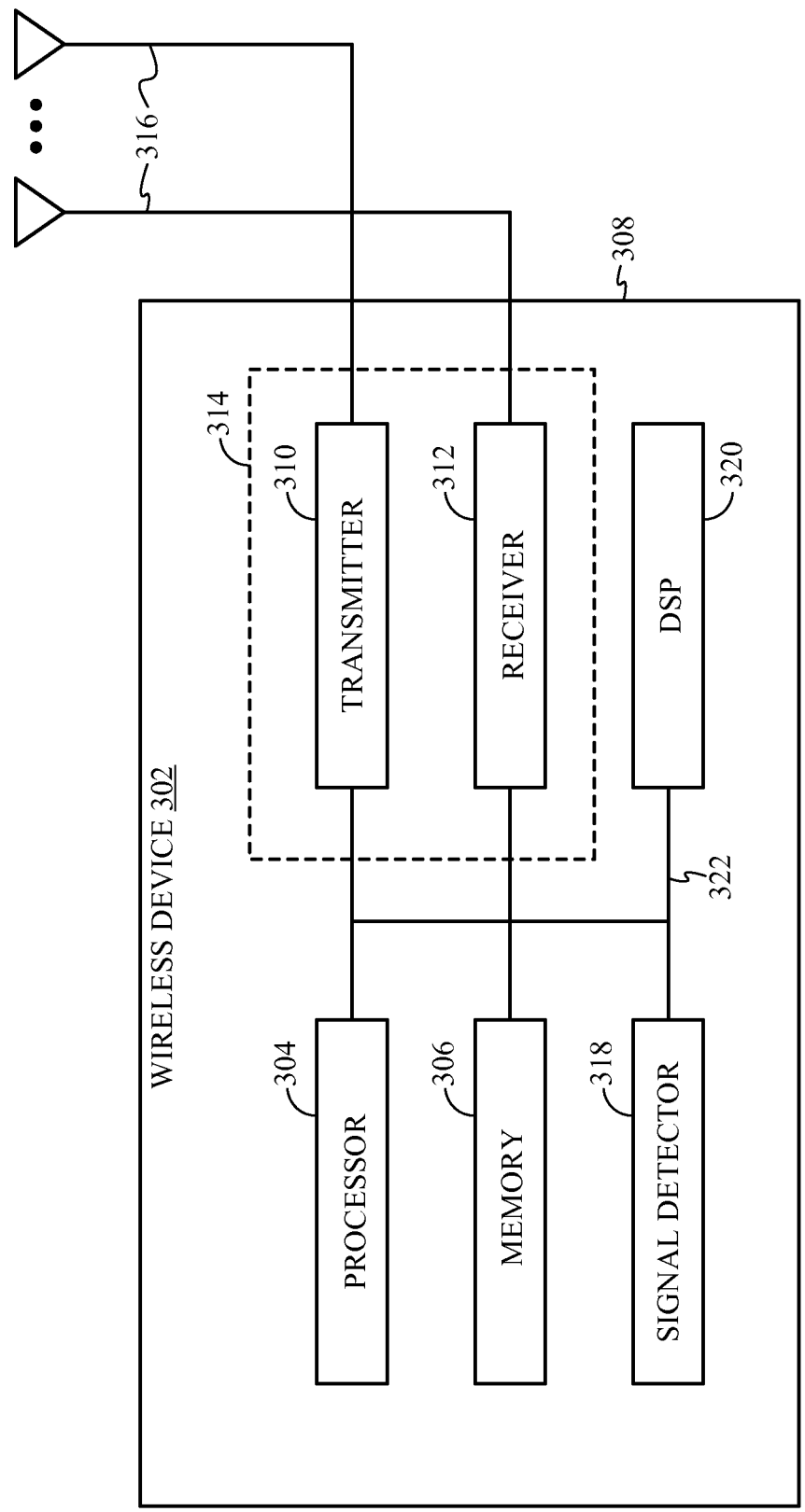
FIG. 3 illustrates a block diagram of an example wireless device in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example FCC Device Modes For TVWS

FIG. 4 illustrates a table 400 of device modes for television white space (TVWS) as defined by the Federal Communications Commission (FCC). TVWS devices include fixed devices, which typically must be installed by a professional and have the locations of the individual devices entered into a database. Mobile/portable TVWS devices include Mode 1 and Mode 2 devices. Fixed and Mode 2 devices are termed enabling stations (STAs), while a device in a Mode 1 operational state is termed a dependent STA.

Moreover, IEEE 802.11af includes a new "advertisement" protocol called the Registered Location Query Protocol (RLQP). This new protocol carries General Advertisement Service (GAS) Action frames for enablement of the TVWS devices. Enablement is the process by which a dependent STA (e.g., a Mode 1 device) is enabled by an enabling STA (e.g., a Mode 2 device). Related messages are transmitted using newly defined Action Frames or using RLQP.

Example Enablement Procedures

In this section, enhancements to enablement are described. These include: (1) a low overhead signaling in IEEE 802.11af to satisfy the FCC's 60 s Contact Verification Signal (CVS) rule for Mode 1 devices and (2) signaling for enabled Mode 1 devices to preserve enablement even when available channels in the TVWS map have changed.

In its latest Order (10-174), the FCC requires that every 60 seconds, a Mode 1 device must obtain over-the-air (OTA) an encoded contact verification signal (CVS) that validates that the Mode 1 device is within a reception range of an enabling (Mode 2 or Fixed) device. The contemporary 802.11af D0.06 signaling does not meet the above requirement. The current design proposes a "list of available channels" sent unencrypted in a beacon, which is not allowed by the FCC.

Figure 5:
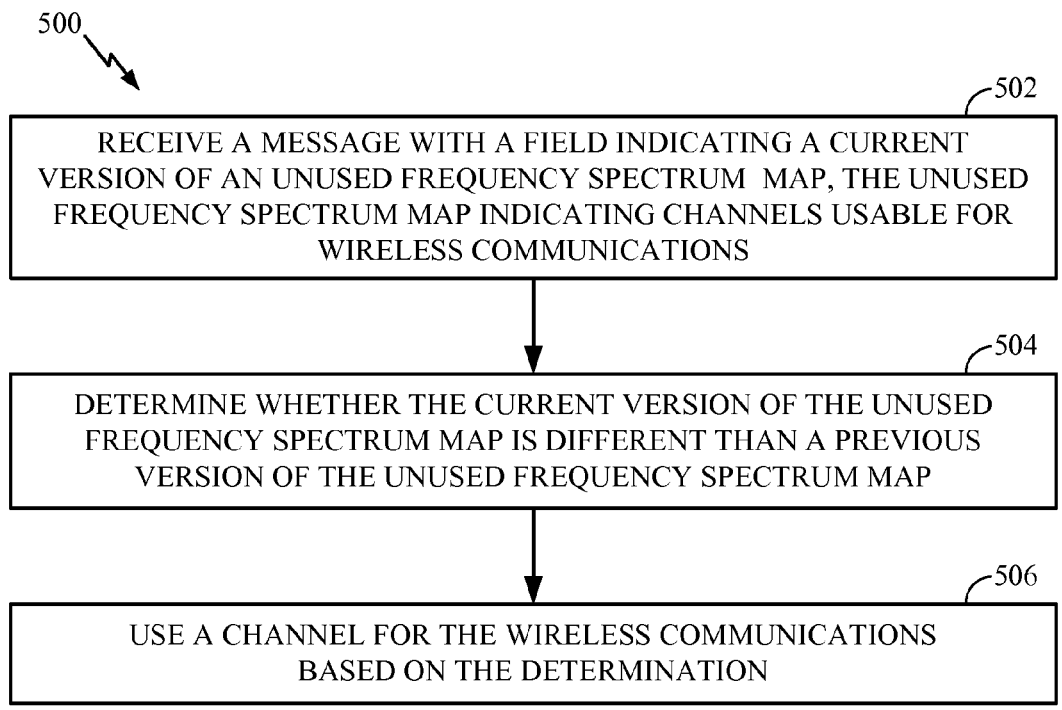
FIG. 5 illustrates example operations to use, from the perspective of a Mode 1 device, a received message with a field indicating a current version of a white space map (WSM), in accordance with certain aspects of the present disclosure.

FIG. 5 illustrates example operations 500 to use, from the perspective of an apparatus such as a Mode 1 device or other portable dependent apparatus, a received message with a field indicating a current version of an unused frequency spectrum map (e.g., a white space map (WSM)). The operations 500 may begin, at 502, by receiving a message with a field indicating a current version of an unused frequency spectrum map, the unused frequency spectrum map indicating channels usable for wireless communications. At 504, the apparatus may determine whether the current version of the unused frequency spectrum map is different than a previous version (e.g., a version of the WSM previously received during enablement of the apparatus) of the unused frequency spectrum map. At 506, the apparatus may use a channel for the wireless communications based on the determination at 504.

If the current version of the unused frequency spectrum map is different than the previous version (e.g., the previously received version) of the unused frequency spectrum map, the apparatus may transmit a request message for an updated unused frequency spectrum map (e.g., an updated WSM). Next, the apparatus may receive a response message with the updated unused frequency spectrum map. If the current version of the unused frequency spectrum map is the same as the previous version, then the apparatus may continue to use the current operating channel for the wireless communications.

For certain aspects as described in greater detail below, the message may comprise a frame with at least one of a first field indicating that the message is a Public Action message or a second field indicating that the message comprises the field indicating the current version of the unused frequency spectrum map. The frame may be a beacon frame or a broadcast management frame, for example.

Figure 6:
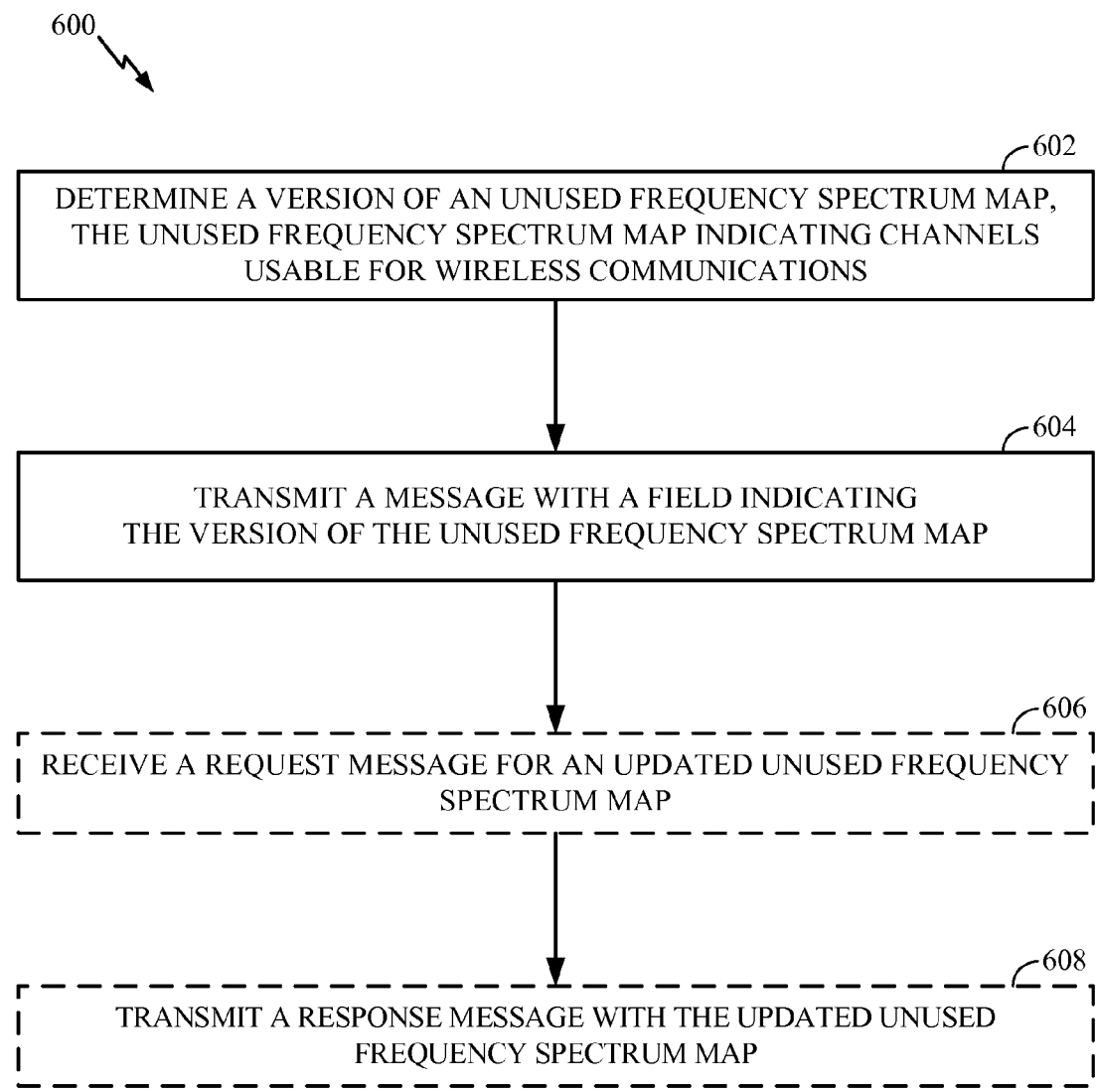
FIG. 6 illustrates example operations to use, from the perspective of a Mode 2 device, a message with a field indicating a current version of a WSM, in accordance with certain aspects of the present disclosure.
Figure 6A:
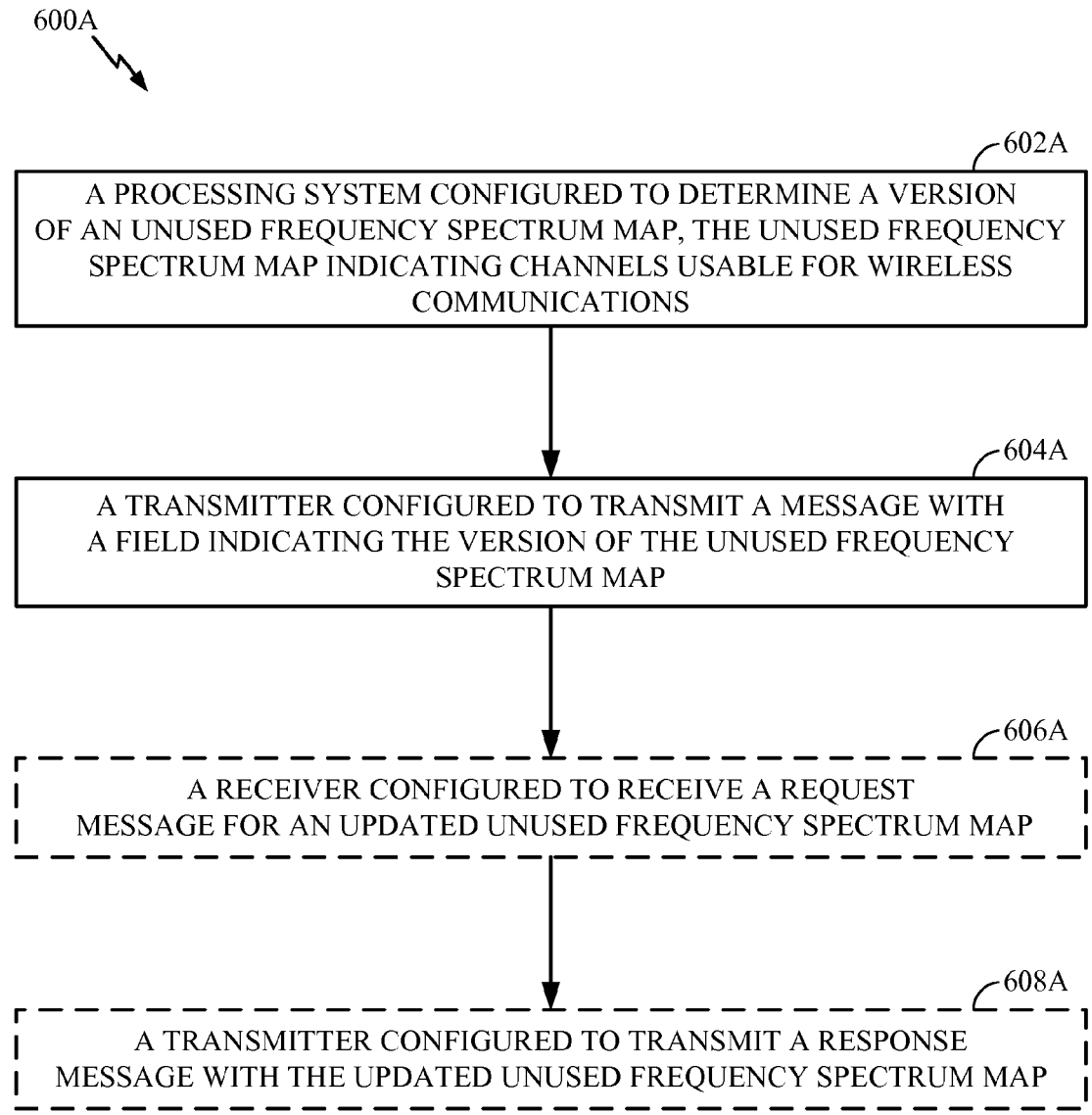
FIG. 6A illustrates example components for performing the operations shown in FIG. 6.

FIG. 6 illustrates example operations 600 to use, from the perspective of an apparatus such as a Mode 2 device or other portable enabling apparatus, a message with a field indicating a current version of an unused frequency spectrum map (e.g., a WSM). The operations 600 may begin, at 602, by determining a version of an unused frequency spectrum map, the unused frequency spectrum map indicating channels usable for wireless communications. At 604, the apparatus may transmit a message with a field indicating the version of the unused frequency spectrum map. At 606, the apparatus may receive a request message for an updated unused frequency spectrum map (e.g., an updated WSM). The apparatus may transmit a response message with the updated unused frequency spectrum map at 608, in response to the received request message. For certain aspects, the operations 600 may include transmitting a beacon frame, for example, comprising an indication of a time at which the message (with the field indicating the version of the unused frequency spectrum map) will arrive.

Figure 7:
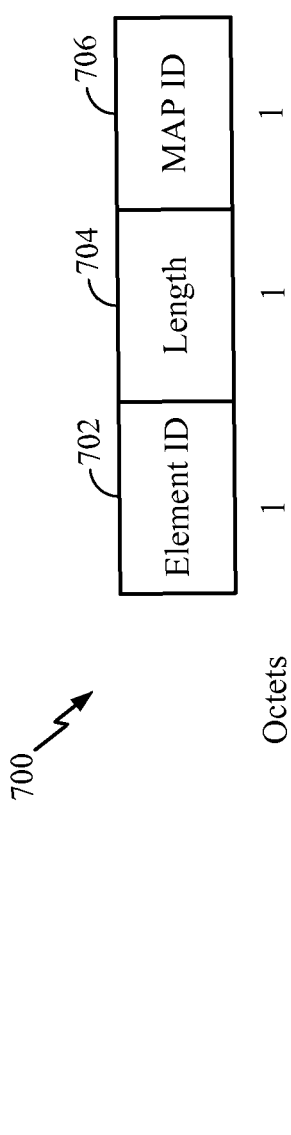
FIG. 7 illustrates an example contact verification information element (CVIE), in accordance with certain aspects of the present disclosure.

FIG. 7 illustrates an example contact verification information element (CVIE) 700 that may be sent to meet the FCC's CVS requirement. The CVS may be transmitted at regular intervals to preserve the authorization to transmit in TVWS. The CVIE 700 comprises an element identifier (ID) 702, identifying that this information element (IE) is a CVS. The CVIE 700 also comprises a length field 704 indicating the length of the remaining portion of the CVIE 700. The CVIE 700 contains a white space map identifier (ID) 706. This MAP ID 706 may contain the White Space Map version number or other identifier (as defined 8.4.2.af1.1 in TGaf Draft 0.05) of the currently valid White Space Map.

The CVIE 700 may most likely be included in every beacon frame transmitted by an Enabling STA. The CVIE 700 may be included in a Probe Response.

The CVIE 700 has many advantages. The CVIE 700 is broadcast over the air as required. The CVIE 700 may be encoded. In this manner, enabled STAs can verify if the list of available channels these STAs have is still valid while those not enabled cannot obtain that list. Broadcasting the WSM is not allowed. The CVIE 700 also has a small overhead, whereas transmitting the entire white space map will incur high overhead.

As described above, a dependent STA may compare the MAP ID 706 in CVIE 700 to the MAP ID received during enablement. If the MAP ID has not changed, the STA can continue using the channel. If the MAP ID has changed, then the STA shall either: (1) restart enablement (e.g., using existing enablement procedures, such as sending a request message for re-enablement to an enabling apparatus) or (2) request a new WSM to check if the channel the STA is using (i.e., the current operating channel) is still available.

To increase the protection of the CVS and ensure the integrity of the sender, Broadcast Integrity Protection (BIP) may be negotiated as part of secure association for certain aspects. In other words, for certain aspects, the CVS may be sent with BIP in a robust broadcast management frame.

Figure 8:
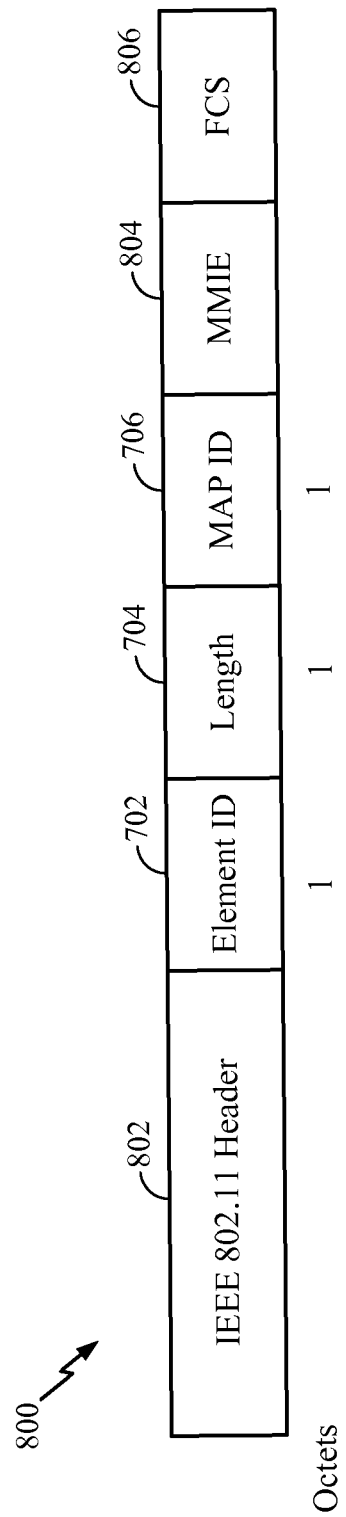
FIG. 8 illustrates an example broadcast management frame containing the CVIE of FIG. 7, in accordance with certain aspects of the present disclosure.

FIG. 8 illustrates an example broadcast management frame 800 containing the CVIE 700 of FIG. 7, in accordance with certain aspects of the present disclosure. The broadcast management frame 800 with the CVIE may be transmitted once every beacon interval to ensure that all enabled STAs of an AP can preserve their enablement. The broadcast management frame 800 may comprise an IEEE 802.11 header 802, a Management Message Integrity Check (MIC) Information Element (MMIE) 804, and a frame check sequence (FCS) 806.

Certain aspects of the present disclosure comprise recovery procedures when the CVIE Map ID 706 changes (i.e., when the current WSM version does not match a version of the WSM received during enablement). In one example scenario, STA1 has not been de-enabled, but the current map version in the CVIE of the beacon has changed. It is wasteful for STA1 to restart the enablement procedure if the channel STA1 uses has not changed its status (i.e., STA1's current operating channel is still available).

Accordingly, certain aspects of the present disclosure employ signaling that allows STA1 to obtain an updated WSM and check if the current operating channel is still valid. For certain aspects, Registered Location Query Protocol (RLQP) messaging may be used to retrieve this new white space map.

Figure 9:
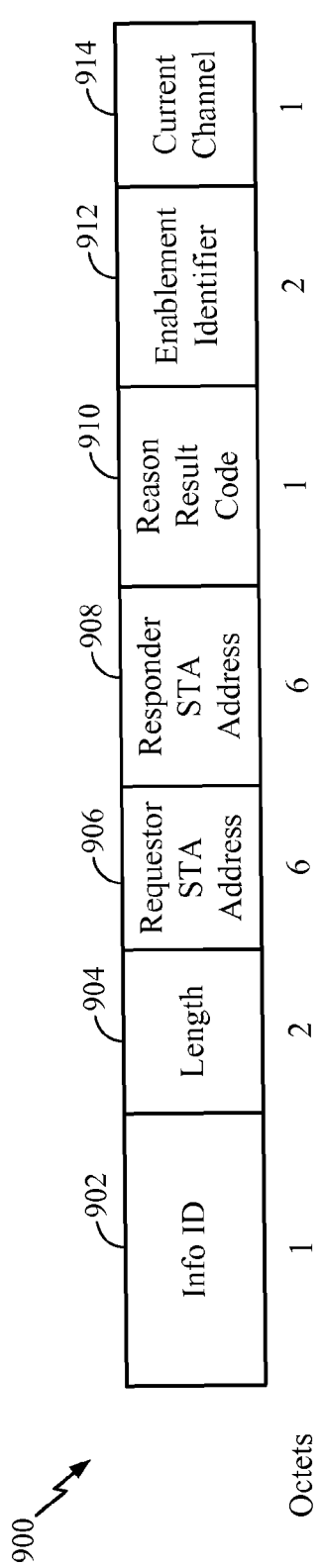
FIG. 9 illustrates an example Registered Location Query Protocol (RLQP) WSM request message format, in accordance with certain aspects of the present disclosure.

FIG. 9 illustrates an example RLQP WSM request message format 900, in accordance with certain aspects of the present disclosure. A WSM Request Message may sent by a STA when the CVIE 700 in the beacon indicates a different (i.e., new) WSM ID. In the WSM request message format 900, an information identifier (ID) field 902 may be set to "request for new WSM" in some manner to be determined The WSM request message may also include a length field 904 indicating the length of a remaining portion of the WSM request message, a requestor address 906 of the STA requesting the WSM, a responder address 908 of an enabling STA on which the STA is dependent, a reason result code field 910, and an enablement ID field 912 set to a value (the enablement ID) received when the apparatus was enabled. The enablement ID may comprise an FCC ID, which may include a grantee code and a product code. A value indicating the current operating channel of the STA may be appended to the WSM request message in the current channel field 914.

In response to receiving a WSM request message, the enabling STA may send a de-enablement message or a WSM response message with the new WSM. The enabling STA may send a de-enabling message if the current channel of the STA is no longer available according to the new WSM. Protected dual of the RLQP action frame may be used if the message is to be sent with encryption.

Figure 10:
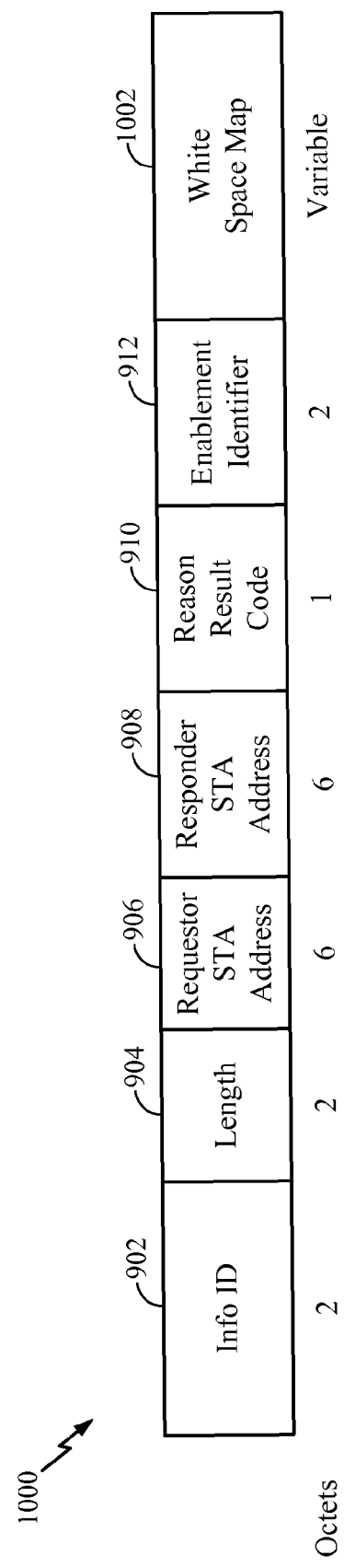
FIG. 10 illustrates an example RLQP WSM response message format, in accordance with certain aspects of the present disclosure.

FIG. 10 illustrates an example RLQP WSM response message format 1000, in accordance with certain aspects of the present disclosure. The WSM response message format 1000 may include an information ID field 902 set to "response to WSM request" in some manner to be determined The enablement ID field 912 may be set to the value obtained during the last enablement. The enablement ID allows the enabler to verify that the dependent STA is indeed enabled and was enabled by the said enabling STA before the enabling STA sends the new white space map 1002.

The WSM 1002 included in the WSM response message may contain the latest (i.e., most recent) Map ID to be used for contact verification. This is more efficient than FCC Id verification. The WSM 1002 should contain current operating channel reported by STA if this channel is still available. Upon receiving the WSM response message, the STA may switch channels to one or more channels indicated as available in the updated WSM 1002 or change power levels according to the power indicated in the updated WSM 1002. Protected dual of the RLQP action frame may be used if the message is to be sent with encryption.

For certain aspects, the WSM query and WSM response messages may be carried using public action messages instead of being carried as information elements (IEs) in RLQP.

Figures 11, 12:
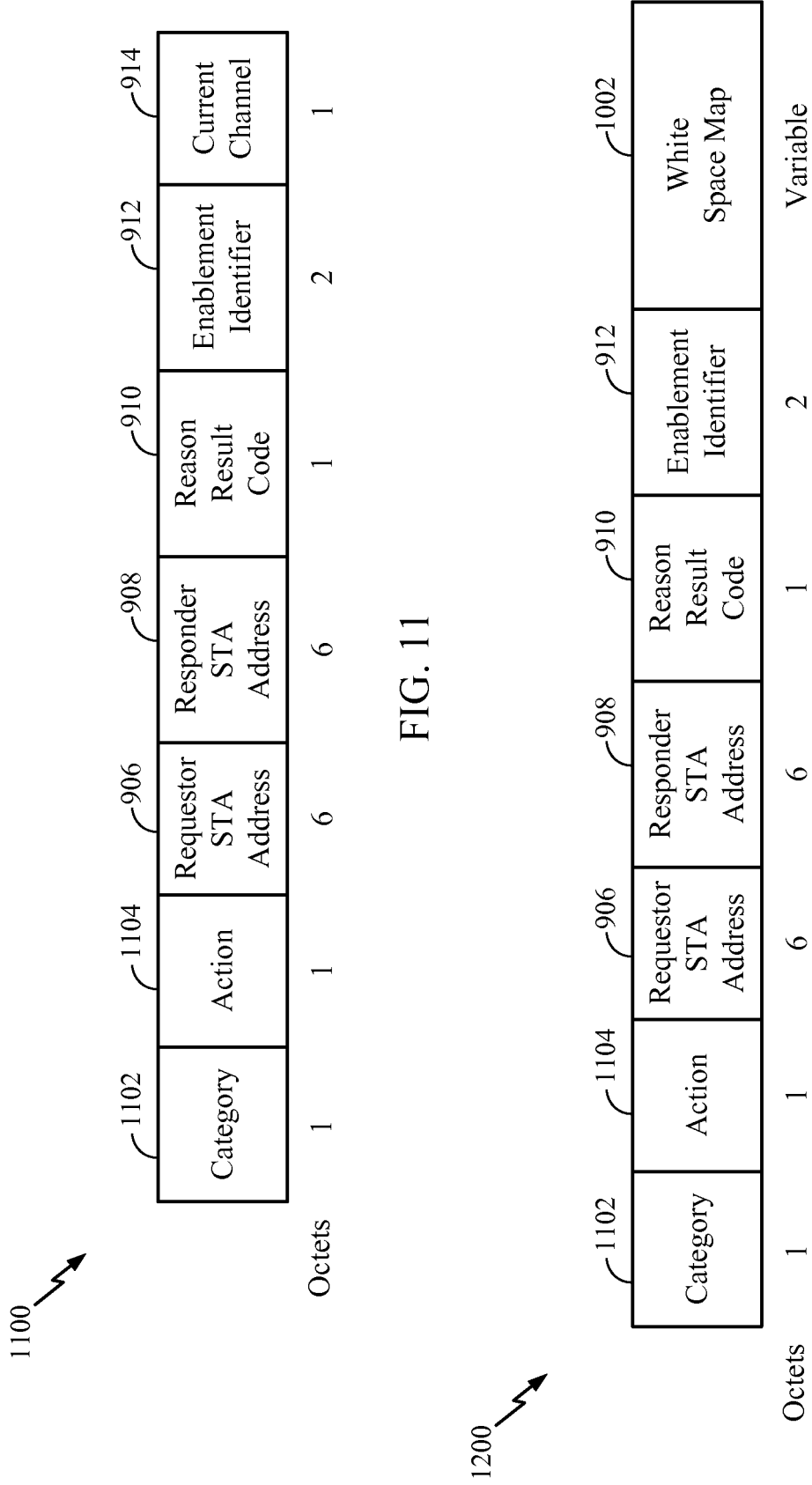
FIG. 11 illustrates an example WSM query message format for a Public Action frame, in accordance with certain aspects of the present disclosure.
FIG. 12 illustrates an example WSM response message format for a Public Action frame, in accordance with certain aspects of the present disclosure.

The DSE WSM Query frame is a Public Action frame used to query for the current WSM. FIG. 11 illustrates an example WSM query message format 1100 for a Public Action frame, in accordance with certain aspects of the present disclosure. In the WSM query message format 1100, a category field 1102 may be set to a value for public action defined in Table 8-36 (Category values), indicating that the WSM query message has a Public Action frame format. The Action Value field 1104 (or Action field) may be set to indicate a DSE WSM Query. The Enablement Identifier (ID) 912 may be set to an enablement identifier received during enablement of the STA. The current channel field 914 may be set to the current operating channel of the STA.

FIG. 12 illustrates an example WSM response message format 1200 for a Public Action frame, in accordance with certain aspects of the present disclosure. In the WSM response message format 1200, the category field 1102 may be set to the value for public action defined in Table 8-36 (Category values). The Action Value field 1104 may be set to indicate a DSE WSM Response.

Figure 20:
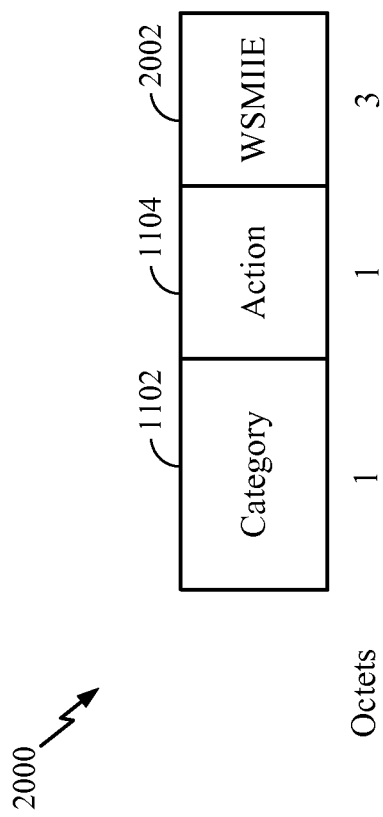
FIG. 20 illustrates an example WSM message format for a Public Action frame, in accordance with certain aspects of the present disclosure.

FIG. 20 illustrates an example WSM message format 2000 for a Public Action frame, in accordance with certain aspects of the present disclosure. Providing the WSM version number or other identifier, the WSM message may be transmitted in a Public Action frame, which may be classified as a beacon frame or a broadcast management frame. In the WSM message format 2000, the category field 1102 may be set to the value for public action defined in Table 8-36 (Category values). The Action Value field 1104 may be set to indicate transmission of a white space MAP ID, which may be included in a WSM identifier information element (WSMIIE) 2002. For certain aspects, the WSMIIE 2002 may have the same fields as the CVIE 700 of FIG. 7, including the element ID 702, the length field 704, and the MAP ID 706. This MAP ID 706 may contain the White Space Map version number or other identifier (as defined 8.4.2.af1.1 in TGaf Draft 0.05) of the currently valid White Space Map.

Figure 21:
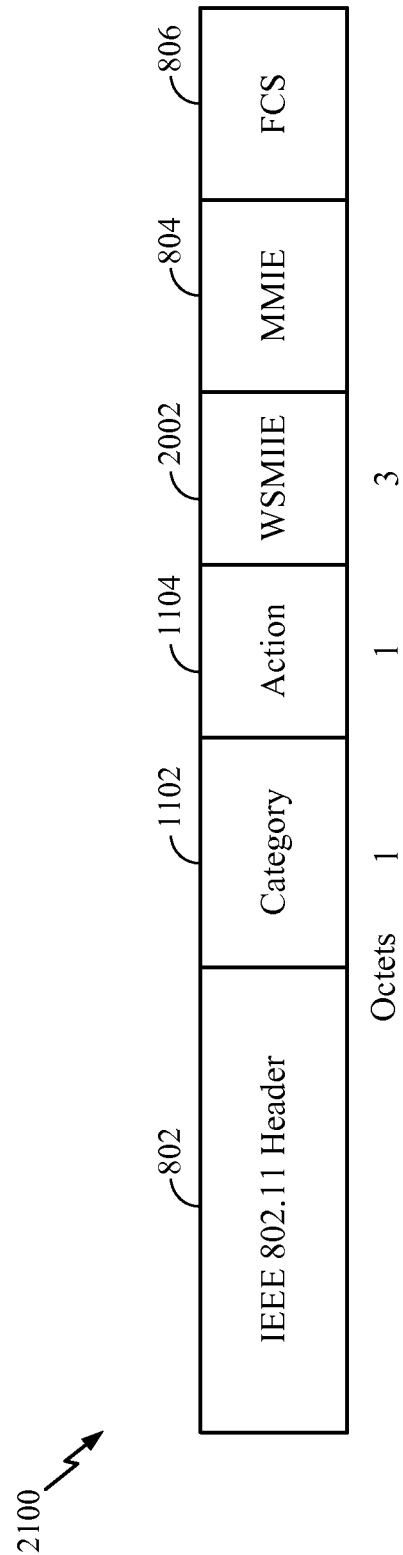
FIG. 21 illustrates an example broadcast management frame containing the WSM message of FIG. 20, in accordance with certain aspects of the present disclosure.

FIG. 21 illustrates an example broadcast management frame 2100 containing the WSM message format 2000 of FIG. 20, in accordance with certain aspects of the present disclosure. The broadcast management frame 2100 with the WSMIIE 2002 may be transmitted as a Public Action frame once every beacon interval to ensure that all enabled STAs of an AP can preserve their enablement. The broadcast management frame 2100 may comprise an IEEE 802.11 header 802, a Management Message Integrity Check (MIC) Information Element (MMIE) 804, and a frame check sequence (FCS) 806.

Example Database Access For Mode 2 Devices

TVWS devices operating in Mode 2 may require database access to retrieve available channels for the current location (at least once every 24 hrs) and for Mode 1 device enablement functions (e.g., FCC ID check for Mode 1 devices requesting enablement). Database access may impose the requirement of a separate MAC/PHY (Media Access Control/Physical layer) technology for internet access to the database. Such access may involve incurring additional costs for Mode 2 devices that primarily function as devices in an intranet-type application. Examples of an intranet application include: an intranet for communication between the workers at a job site, a network for co-ordination of emergency services at a disaster zone, an intranet which does not have internet access due to security restrictions.

To address this problem, certain aspects of the present disclosure comprise design protocol and messaging to enable Mode 2 capable devices to access the database via a neighboring Mode 2/Fixed device. This allows for Mode 2 capable devices without separate internet access to operate as Mode 2/Fixed devices using the TVWS MAC/PHY. In addition, this avoids requiring association for database access since database access is required sporadically. Instead, General Advertisement Service (GAS) frames may be used to tunnel messages for database access.

Figure 13:
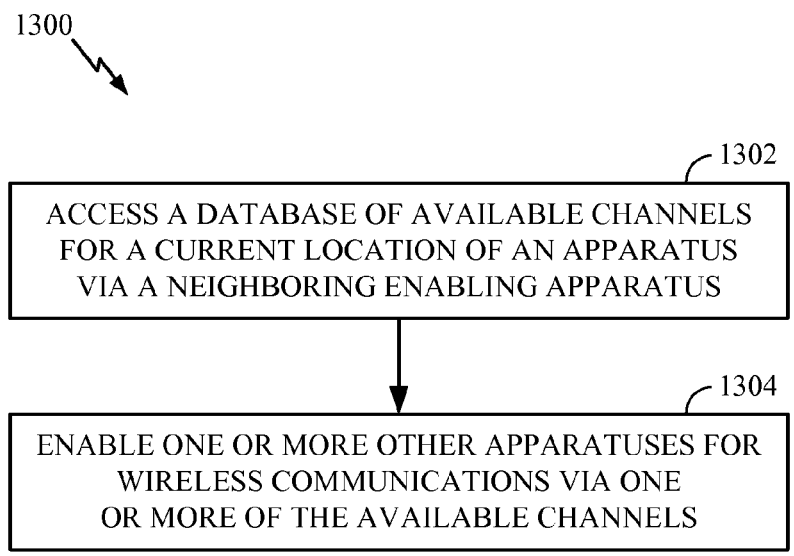
FIG. 13 illustrates example operations to access, from the perspective of an apparatus such as a Mode 2 capable device, a database of available channels for a current location of the apparatus via a neighboring portable or fixed enabling apparatus (e.g., a Fixed or Mode 2 device), in accordance with certain aspects of the present disclosure.
Figure 13A:
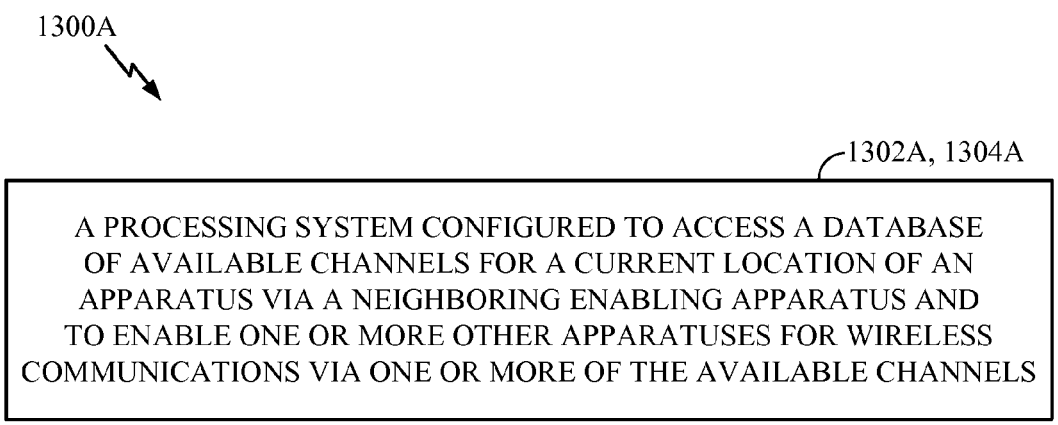
FIG. 13A illustrates example components for performing the operations shown in FIG. 13.

FIG. 13 illustrates example operations 1300 to access, from the perspective of an apparatus configured, for example, as a Mode 2 capable device, a database of available channels for a current location of the apparatus via a neighboring portable or fixed enabling apparatus (e.g., a Fixed or Mode 2 device). The operations 1300 may begin, at 1302, by accessing a database of available channels for a current location of an apparatus via a neighboring portable enabling or fixed enabling apparatus (e.g., a Mode 2 or a Fixed TVWS device as defined by the FCC). At 1304, the apparatus may enable one or more other apparatuses (e.g., portable dependent apparatuses) for wireless communications via one or more of the available channels.

For certain aspects, the apparatus may query the neighboring apparatus for access capabilities to the database. For certain aspects, the apparatus may receive a Registered Location Query Protocol (RLQP) message from the neighboring apparatus indicating that the neighboring apparatus is database access capable (DBAC). For certain aspects, the apparatus may receive, from the neighboring apparatus, a RLQP message with vendor-specific information elements (IEs) indicating a database access parameter or protocol for one or more database vendors.

For certain aspects, accessing the database of available channels at 1302 may comprise accessing the database by obtaining enablement to operate as a portable dependent apparatus from the neighboring apparatus and transmitting a query message to the database of the available channels via the neighboring apparatus. The operations 1300 may further comprise receiving a response message with the available channels. According to certain aspects, the portable dependent apparatus changes from a Mode 1 device to a Mode 2 device upon receiving the response message with the available channels for the current location.

Figure 14:
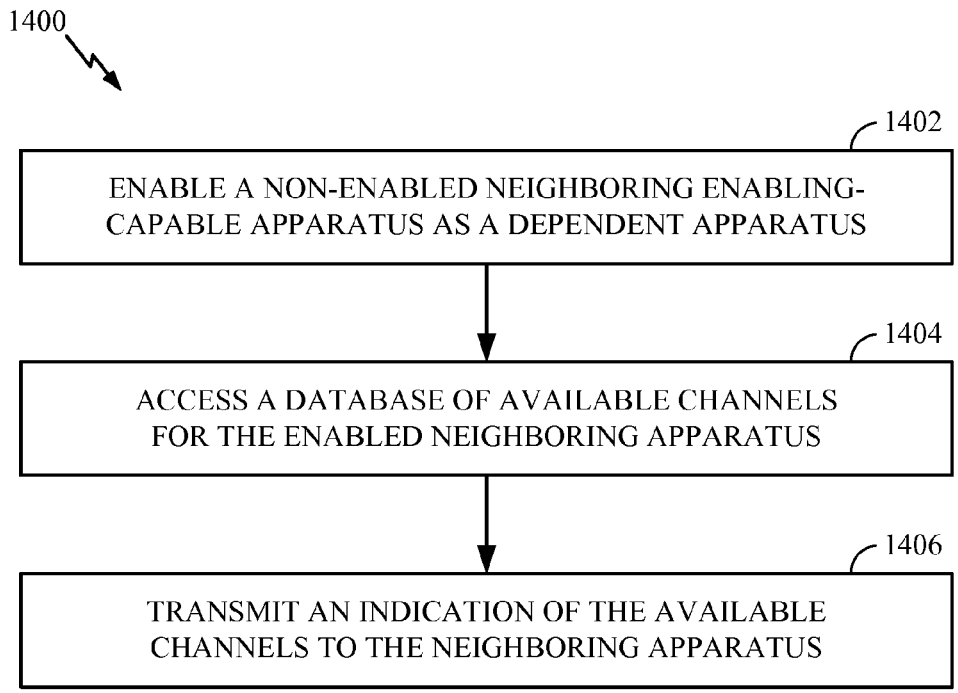
FIG. 14 illustrates example operations to access, from the perspective of an apparatus such as a Fixed or Mode 2 device, a database of available channels for a neighboring portable enabling-capable apparatus (e.g., a Mode 2 capable device), in accordance with certain aspects of the present disclosure.
Figure 14A:
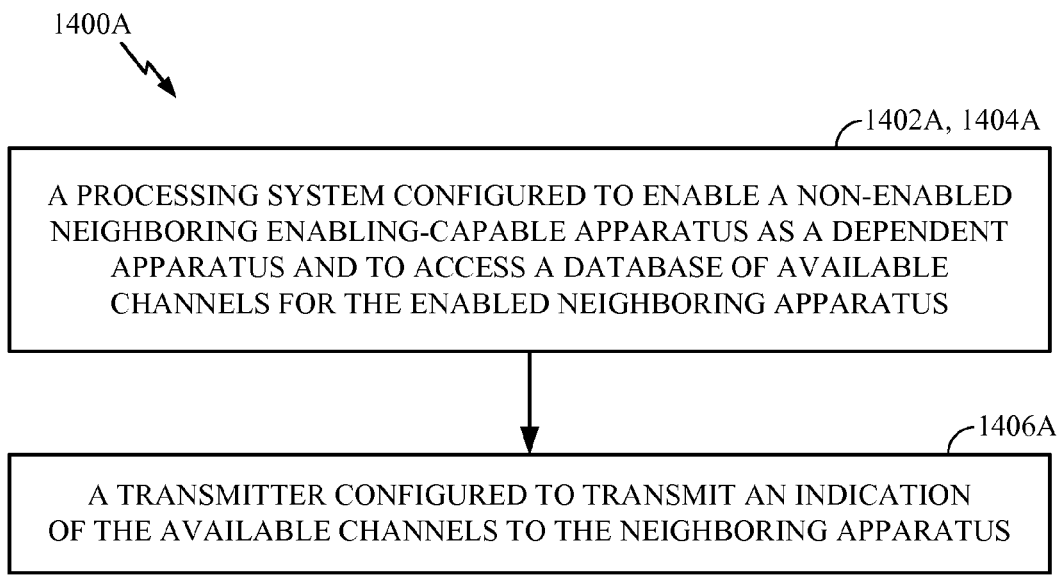
FIG. 14A illustrates example components for performing the operations shown in FIG. 14.

FIG. 14 illustrates example operations 1400 to access, from the perspective of an apparatus configured, for example, as a Fixed or Mode 2 device, a database of available channels for a neighboring portable enabling-capable apparatus (e.g., a Mode 2 capable device). The operations 1400 may begin, at 1402, by enabling a non-enabled neighboring (portable) enabling-capable apparatus as a (portable) dependent apparatus. At 1404, the apparatus may access a database of available channels for the enabled neighboring apparatus. The apparatus may then transmit an indication of the available channels (e.g., a white space map) to the neighboring apparatus at 1406.

According to certain aspects, the apparatus may transmit a RLQP message indicating that the apparatus is DBAC. For certain aspects, the apparatus may transmit a RLQP message with vendor-specific IEs indicating a database access parameter or protocol for one or more database vendors.

Figure 15:
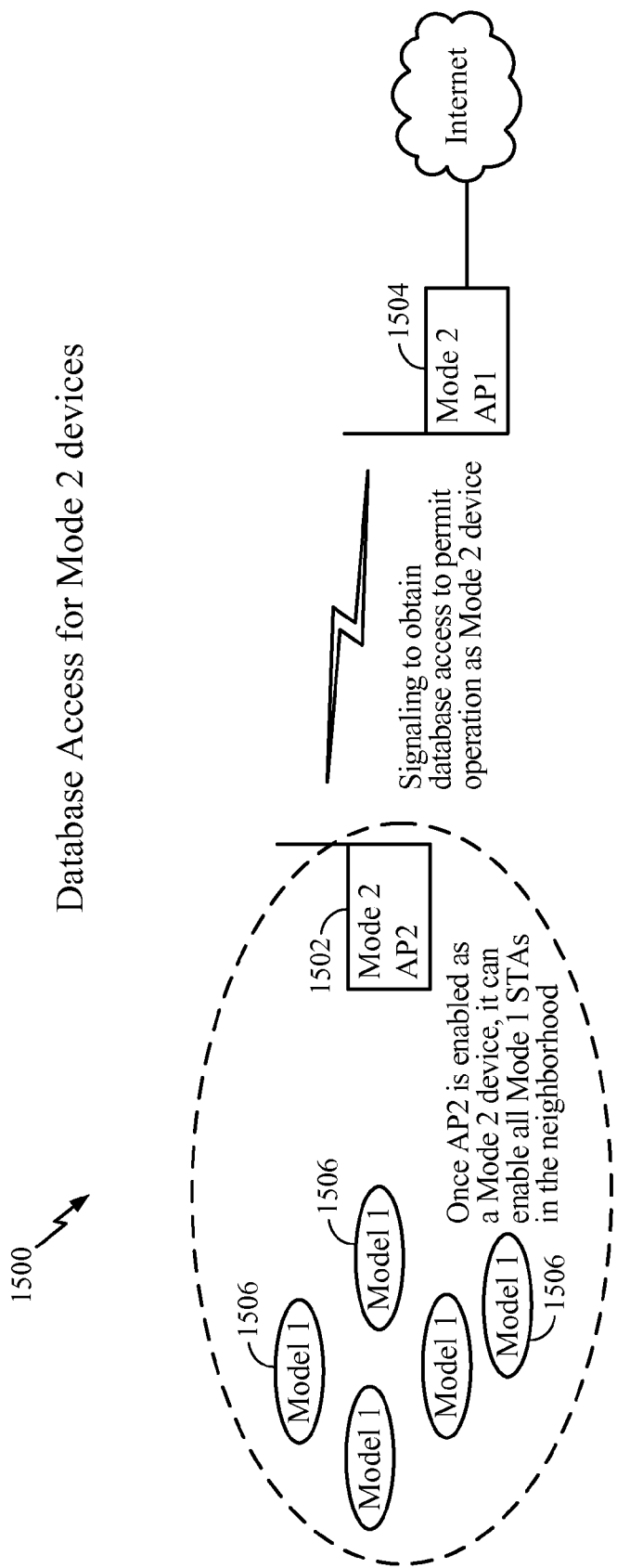
FIG. 15 illustrates a diagram of database access for a Mode 2 capable access point (AP) via a Mode 2 AP in an example wireless communications network, in accordance with certain aspects of the present disclosure.

FIG. 15 illustrates a diagram of database access for a Mode 2 capable access point (AP) 1502 via a Mode 2 AP 1504 in an example wireless communications network 1500, in accordance with certain aspects of the present disclosure. First, the Mode 2 capable AP 1502 may signal the Mode 2 AP 1504 to obtain database access to permit operation as a Mode 2 device. Once the Mode 2 capable AP 1502 has been enabled as a Mode 2 device, the AP 1502 may enable one or more Mode 1 STAs 1506 in the network.

For certain aspects, a Mode 2 device may indicate that this device is "Database access capable (DBAC)" in the beacon or in an RLQP message, for example. Options for indicating such capability are described below.

Figure 16:
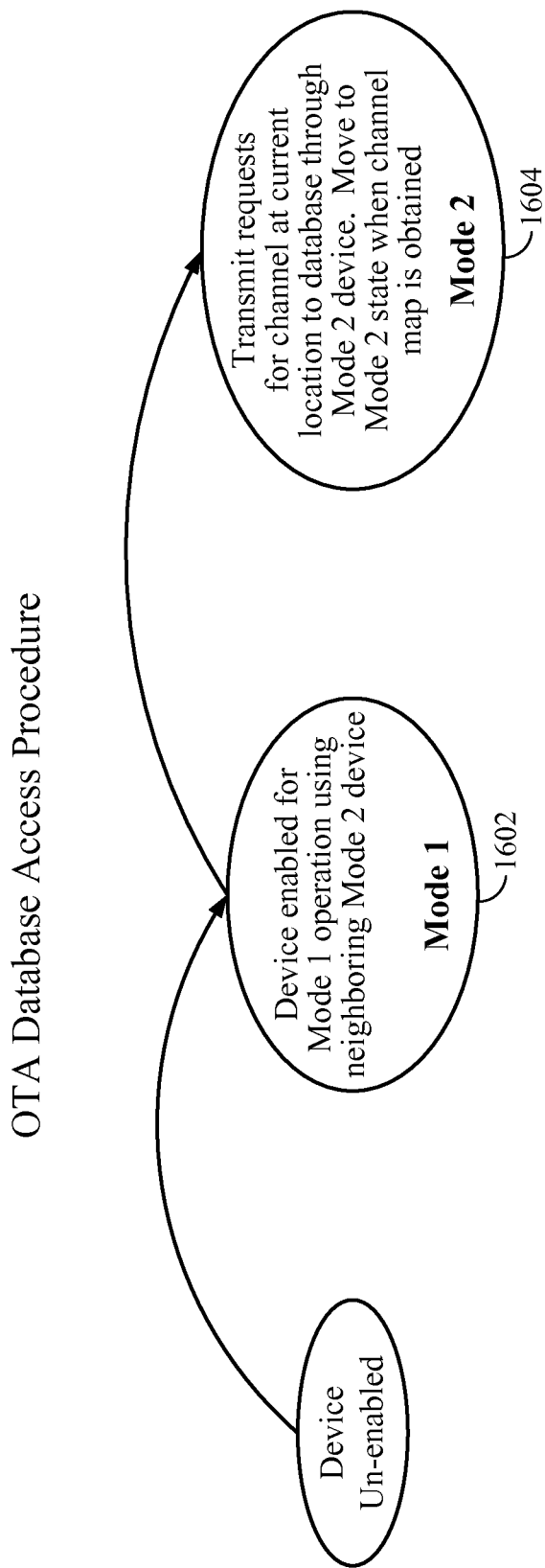
FIG. 16 illustrates an over-the-air (OTA) database access procedure, in accordance with certain aspects of the present disclosure.

FIG. 16 illustrates an over-the-air (OTA) database access procedure, in accordance with certain aspects of the present disclosure. In a first step at 1602, a non-enabled or de-enabled Mode 2 capable STA may obtain enablement to operate in Mode 1. All enablement procedures for Mode 1 enablement must typically be followed. Once the STA has been enabled as a Mode 1 device, then database query messages may be transmitted to the database through the DBAC Mode 2 device at a second step at 1604. These database query messages may be carried in GAS frames for certain aspects.

There may be several over-the-air (OTA) protocol options for the database query/response messages. For certain aspects, a new protocol may be defined for carrying database query/responses in Public Action Frames. As a benefit, the messages may have lower overhead, but this solution involves yet another tunneling protocol. For other aspects, a database query/response may be added to the IEEE 802.11u ANQP (Access Network Query Protocol). The database query/response may fit nicely with the function of ANQP, but ANQP support is not currently required in 802.11af. Yet another option is to extend RLQP to include tunneling of database query/responses. RLQP is already in 802.11af (for Mode 1 enablement as described above, for example).

As an assumption for database access, each database vendor may have its own proprietary database query/response protocol or parameters. The DBAC Mode 2 device may indicate the databases it can access using vendor-specific IEs.

FIG. 17 illustrates an extension to RLQP information identifier (ID) definitions for OTA database access, in accordance with certain aspects of the present disclosure. Three types of information elements (IEs) may be added to RLQP for database access. The RLQP may be extended to include an RLQP IE 1702 for a capability query. For database access capabilities, a separate query response may be required. The beacon may only indicate that the Mode 2 device is RLQP capable, but may not indicate capability options with RLQP. The RLQP may also be extended to include an RLQP IE 1704 for capability listing, indicating the capability of the OTA database access. Vendor-specific IEs may be used with indications defined by one or more database vendors. These RLQP vendor-specific IEs may indicate database access parameters or protocols from the database vendors. The third type of RLQP IE may comprise RLQP IEs 1706 for carrying the database access query and corresponding response messages.

FIG. 18 illustrates an example RLQP database access query message format 1800 for the RLQP IE 1706, in accordance with certain aspects of the present disclosure. The RLQP query message sent in the RLQP IE 1706 may contain an information identifier (ID) field 902 set to indicate database query, a database ID field 1802, and database query message 1804. The database ID field 1802 may comprise a uniform resource locator (URL) or an Internet Protocol (IP) address for the database or a vendor-specific database identifier. The database query message 1804 may be security encapsulated to form the security encapsulated database query message shown in FIG. 18. The enablement ID field 912 may be set to an identifier obtained during Mode 1 enablement of the Mode 2 capable device.

FIG. 19 illustrates an example RLQP database access response message format 1900, in accordance with certain aspects of the present disclosure. The RLQP database response may indicate that the database is inaccessible, that there was no response from the database, or the available channels for the current location of the Mode 2 capable device. The RLQP database response sent in the RLQP IE 1706 may contain an information ID field 902 set to indicate database response and a database response message 1902, which may be security encapsulated to form the security encapsulated database response message shown in FIG. 19.

The contents of the (security encapsulated) database query and response messages may depend on the exact protocol between a querying Mode 2 capable STA and a Mode 2/Fixed device and are to be determined.

Figure 5A:
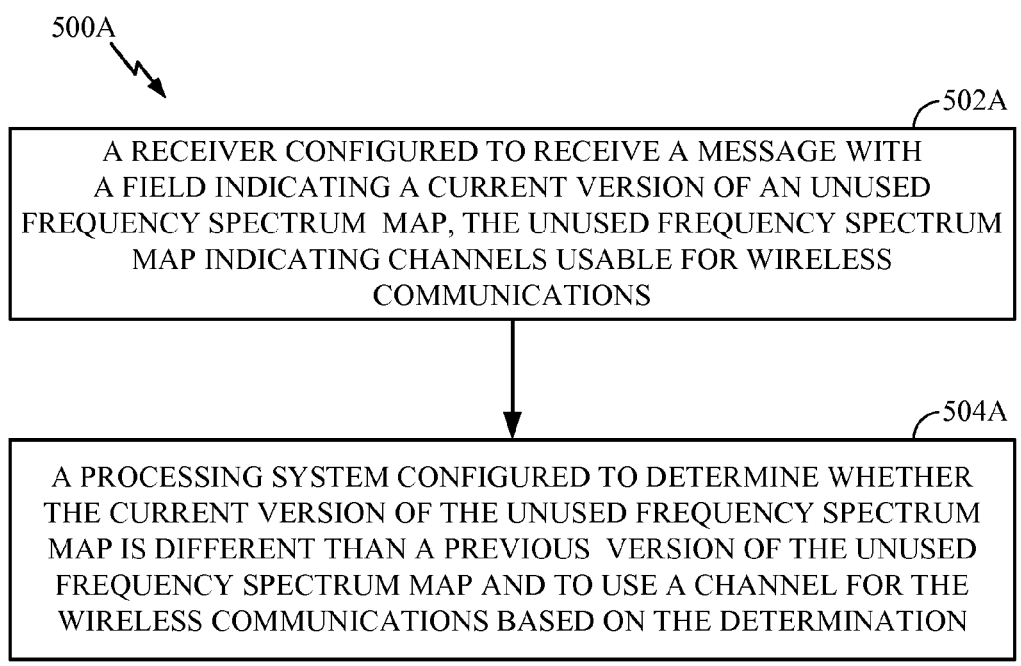
FIG. 5A illustrates example components for performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to components 500A illustrated in FIG. 5A.

For example, means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for processing, means for determining, means for accessing, means for enabling, or means for querying may comprise a processing system, which may include one or more processors, such as the RX data processor 270, the TX data processor 288, and/or the controller 280 of the user terminal 120 or the RX data processor 242, the TX data processor 210, and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first apparatus for wireless communications, comprising:
a processing system configured to determine a version of an unused frequency spectrum map, the unused frequency spectrum map indicating channels usable for wireless communications in a television white space (TVWS); and
a transmitter configured to transmit a message based on the determination with:
a field indicating the version of the unused frequency spectrum map, and
an indication that the message is a contact verification signal (CVS).

2. The first apparatus of claim 1, further comprising a receiver configured to receive a request message for an updated unused frequency spectrum map, wherein the request message comprises:
at least one of an address of a second apparatus that transmitted the request message, an address of the first apparatus, an enablement identifier (ID), or a field indicating a current operating channel of the second apparatus;
a Registered Location Query Protocol (RLQP) message, wherein the RLQP message comprises at least one of an information ID field indicating that the request message is for requesting the updated unused frequency spectrum map or a length field indicating a length of a remaining portion of the request message; or
at least one of a category field indicating that the request message is a Public Action message or an action field indicating that the request message is for requesting the updated unused frequency spectrum map.

3. The first apparatus of claim 1, further comprising a receiver configured to receive a request message for an updated unused frequency spectrum map, wherein the transmitter is configured to transmit a response message comprising:
the updated unused frequency spectrum map; and
at least one of an information identifier (ID) field indicating that the response message is in response to the request message for the updated unused frequency spectrum map, a length field indicating a length of a remaining portion of the response message, an address of a second apparatus that transmitted the request message, an address of the first apparatus, or an enablement ID.

4. The first apparatus of claim 1, further comprising a receiver configured to receive a request message for an updated unused frequency spectrum map, wherein the transmitter is configured to transmit a response message comprising:
the updated unused frequency spectrum map; and
at least one of a category field indicating that the response message is a Public Action message, an action field indicating that the response message is in response to the request message for the updated unused frequency spectrum map, an address of the first apparatus, an address of an enabling apparatus, or an enablement identifier (ID).

5. The first apparatus of claim 1, further comprising a receiver configured to receive a request message for re-enablement to the first apparatus from a second apparatus.

6. The first apparatus of claim 1, wherein the message comprises a beacon frame or a broadcast management frame, the beacon frame or the broadcast management frame comprising a Management Message Integrity Check (MIC) Information Element (MMIE).

7. The first apparatus of claim 6, wherein the transmitter is configured to transmit the beacon frame comprising an indication of a time at which the message with the MMIE and the field indicating the version of the unused frequency spectrum map will arrive.

8. A method for wireless communications, comprising:
determining, at a first apparatus, a version of an unused frequency spectrum map, the unused frequency spectrum map indicating channels usable for wireless communications in a television white space (TVWS); and
transmitting a message based on the determination with:
a field indicating the version of the unused frequency spectrum map, and
an indication that the message is a contact verification signal (CVS).

9. The method of claim 8, further comprising receiving a request message for an updated unused frequency spectrum map, wherein the request message comprises:
at least one of an address of a second apparatus that transmitted the request message, an address of the first apparatus, an enablement identifier (ID), or a field indicating a current operating channel of the second apparatus;
a Registered Location Query Protocol (RLQP) message, wherein the RLQP message comprises at least one of an information ID field indicating that the request message is for requesting the updated unused frequency spectrum map or a length field indicating a length of a remaining portion of the request message; or
at least one of a category field indicating that the request message is a Public Action message or an action field indicating that the request message is for requesting the updated unused frequency spectrum map.

10. The method of claim 8, further comprising:
receiving a request message for an updated unused frequency spectrum map; and
transmitting a response message comprising:
the updated unused frequency spectrum map; and
at least one of an information identifier (ID) field indicating that the response message is in response to the request message for the updated unused frequency spectrum map, a length field indicating a length of a remaining portion of the response message, an address of a second apparatus that transmitted the request message, an address of the first apparatus, or an enablement ID.

11. The method of claim 8, further comprising:
receiving a request message for an updated unused frequency spectrum map; and
transmitting a response message comprising:
the updated unused frequency spectrum map; and
at least one of a category field indicating that the response message is a Public Action message, an action field indicating that the response message is in response to the request message for the updated unused frequency spectrum map, an address of the first apparatus, an address of an enabling apparatus, or an enablement identifier (ID).

12. The method of claim 8, further comprising receiving a request message for re-enablement to the first apparatus from a dependent apparatus.

13. The method of claim 8, wherein the message comprises a beacon frame or a broadcast management frame, the beacon frame or the broadcast management frame comprising a Management Message Integrity Check (MIC) Information Element (MMIE).

14. The method of claim 13, further comprising transmitting the beacon frame comprising an indication of a time at which the message with the MMIE and the field indicating the version of the unused frequency spectrum map will arrive.

15. A first apparatus for wireless communications, comprising:
means for determining a version of an unused frequency spectrum map, the unused frequency spectrum map indicating channels usable for wireless communications in a television white space (TVWS); and
means for transmitting a message based on the determination with:
a field indicating the version of the unused frequency spectrum map, and
an indication that the message is a contact verification signal (CVS).

16. The first apparatus of claim 15, further comprising means for receiving a request message for an updated unused frequency spectrum map, wherein the request message comprises:
at least one of an address of a second apparatus that transmitted the request message, an address of the first apparatus, an enablement identifier (ID), or a field indicating a current operating channel of the second apparatus;
a Registered Location Query Protocol (RLQP) message, wherein the RLQP message comprises at least one of an information ID field indicating that the request message is for requesting the updated unused frequency spectrum map or a length field indicating a length of a remaining portion of the request message; or at least one of a category field indicating that the request message is a Public Action message or an action field indicating that the request message is for requesting the updated unused frequency spectrum map.

17. The first apparatus of claim 15, further comprising means for receiving a request message for an updated unused frequency spectrum map, wherein the means for transmitting is configured to transmit a response message comprising:

the updated unused frequency spectrum map; and at least one of an information identifier (ID) field indicating that the response message is in response to the request message for the updated unused frequency spectrum map, a length field indicating a length of a remaining portion of the response message, an address of a second apparatus that transmitted the request message, an address of the first apparatus, or an enablement ID.

18. The first apparatus of claim 15, further comprising means for receiving a request message for an updated unused frequency spectrum map, wherein the means for transmitting is configured to transmit a response message comprising:

the updated unused frequency spectrum map; and at least one of a category field indicating that the response message is a Public Action message, an action field indicating that the response message is in response to the request message for the updated unused frequency spectrum map, an address of the first apparatus, an address of an enabling apparatus, or an enablement identifier (ID).

19. The first apparatus of claim 15, further comprising means for receiving a request message for re-enablement to the first apparatus from a second apparatus.

20. The first apparatus of claim 15, wherein the message comprises a beacon frame or a broadcast management frame, the beacon frame or the broadcast management frame comprising a Management Message Integrity Check (MIC) Information Element (MMIE).

21. The first apparatus of claim 20, wherein the means for transmitting is configured to transmit the beacon frame comprising an indication of a time at which the message with the MMIE and the field indicating the version of the unused frequency spectrum map will arrive.

22. A non-transitory computer-readable medium comprising instructions, executable by at least one processor, for:

determining, at an apparatus, a version of an unused frequency spectrum map, the unused frequency spectrum map indicating channels usable for wireless communications in a television white space (TVWS); and transmitting a message based on the determination with:
a field indicating the version of the unused frequency spectrum map, and
an indication that the message is a contact verification signal (CVS).

23. An access point, comprising:

at least one antenna;

a processing system configured to determine a version of an unused frequency spectrum map, the unused frequency spectrum map indicating channels usable for wireless communications in a television white space (TVWS); and a transmitter configured to transmit, via the at least one antenna, a message based on the determination with:
a field indicating the version of the unused frequency spectrum map, and
an indication that the message is a contact verification signal (CVS).

* * * * *